Patented May 6, 1952

2,595,797

UNITED STATES PATENT OFFICE 2,595,797

PROCESS OF PRODUCING AQUEOUS DISPERSIONS OF RUBBERLIKE PLASTICS

George F. Leyonmark, Avenel, and Erving Arundale, Westfield, N. J., assignors to Standard Oil Development Company, a corporation of Delaware No Drawing. Application June 11, 1949, Serial No. 98,628

5 Claims. (Cl. 260—29.6)

The present invention relates to an improved process for producing aqueous dispersions of highly polymerized organic substances.

Highly polymerized organic substances are often used in the form of aqueous dispersions because these can be prepared in higher concentrations than solutions and can be handled more easily.

It has already been proposed to bring highly polymerized organic substances into aqueous dispersion by dispersing organic solvent solutions of the substances in water and then removing the organic solvent. Difficulties are often encountered, however, in connection with certain types of polymers. For example, it has been impossible to prepare water dispersions of copolymers of styrene and isobutylene because of the nature of the product. It does not lend itself to grinding in the ball mill technique due to its inherent rubbery characteristics. It cannot be dispersed by the internal mixer techniques because it is not sufficiently plastic at temperatures below the boiling point of water. It cannot be dispersed by the usual solvent techniques mentioned above because of its sensitivity to high temperatures. Temperatures high enough to drive off the solvent cause the polymer to agglomerate or coagulate.

It has now been found that the copolymers of styrene and isobutylene, as well as other highly polymerized materials, can be dispersed in water by introducing a solution of the polymer (in a volatile organic water-insoluble liquid) into water containing 2%–6% of a surface-active agent, under pressure and at a temperature of 70–100° F. and flashing off the solvent, while maintaining the temperature at 70–100° F. It is particularly important that the temperature be maintained at 70–100° F. because at lower temperatures, particularly when using methyl chloride as the solvent, hydrates form which render the emulsion unstable. At temperatures above 100° F. the polymer agglomerates.

Highly polymerized water-insoluble substances which are especially suitable for the process are for example polyisobutylene, natural or synthetic rubber, polyvinyl compounds, such as acrylic and methacrylic acid esters and polyvinyl ethers and also cellulose derivatives, such as benzyl cellulose, copolymers of isobutylene with butadiene or isoprene described in U. S. 2,356,128, copolymers of isobutylene and styrene described in U. S. 2,274,749, and various resinous, rubbery or oily copolymers of butadiene and styrene, butadiene and acrylonitrile, polymers of diolefins, drying oils and the like.

As water-insoluble volatile organic liquids the following are suitable: methyl chloride, ethyl chloride, ethane, propane, butane ethylene, pentane, or other organic solvents boiling below about 100° F.

The surface active agents found suitable for the improved process of dispersion of the present invention are any of those disclosed in "Industrial and Engineering Chemistry" for January, 1939, pages 66–69; January, 1949, pages 16–22; January, 1943, pages 126–130.

The process may be carried out, for example, in the case of a copolymer of isobutylene and styrene, as follows:

The copolymer is dissolved in a water-insoluble solvent in a concentration sufficient for emulsification. The solution is carried out under the vapor pressure of the solvent and at room temperature. It is then introduced under pressure into water containing 2%–6% of a surface-active agent. An antifoamant may be added and the contents of the vessel are agitated until emulsification is obtained while maintaining the temperature at about 70° F.

The solvent is flashed off, by releasing the pressure and the dispersion drawn off and allowed to cream.

The aqueous dispersions thus obtained are, contrasted with the solutions, very mobile. They may diluted to any extent, fillers and pigments may be added and they may be mixed with dispersions of other substances, as for example asphalt or bitumen, and also highly polymerized substances, as for example with rubber latex or similar artificial latices. Mixtures of rubber latex and the said dispersions may also be vulcanized.

The dispersions may be used in the same way as other known dispersions of highly polymerized substances, as for example for the prepartion of coatings, impregnations, as painting pastes for textiles, as for example for the prepartion of auto covering materials, for the prepartion of immersion bodies, and as adhesives and binding agents.

The following examples will further illustrate how this invention may be carried out in practice but the invention is not restricted to these examples:

Example 1

A (30%) solution of a copolymer of 50% isobutylene and 50% styrene in methyl chloride, in a sealed container under its own pressure at room temperature, was pressured into an agitated pressure vessel containing a (2%) water solution of dioctyl ester of sodium sulfo-succinic acid in equal volume. The vessel was equipped with an internal coil for controlling the temperature, a valve for flashing off the solvent, a sight glass by means of which excessive foaming could be observed, and a valve at the bottom through which the finished dispersion could be removed from the agitator.

An antifoamant, polysilicone oil (200) in the amount of 0.03% based on the water present, was then added.

The contents of the vessel were violently agitated for four hours to produce emulsification. Throughout this operation the temperature was maintained at 75° F.

The methyl chloride was then flashed off by means of the valve provided. The temperature was maintained at 75° F. Towards the end of the flashing operation, approximately 0.1% potassium oleate based on the solids content was added as a stabilizer to avoid crusting or overrich creaming.

When all of the solvent had been removed, the dispersion was drawn off from the agitator and allowed to cream. Within twenty-four hours the dispersion had creamed to over fifty percent solids, less than two percent solids remaining in the serum. This dispersion was still stable after two-months standing and showed no tendency to overrich creaming.

*Example 2*

A 30% solution of a copolymer of 50% styrene and 50% isobutylene in ethyl chloride in a sealed container under its own pressure at room temperature was pressured into a turbo mixer containing an equal volume of a 2% water solution of a dioctyl ester of sodium sulfo-succinic acid.

The contents of the vessel were agitated for about two hours while the temperature and pressure were held at 80° F. and 25 p. s. i., respectively. A sample taken in a pressure bottle indicated good emulsification.

The solvent was flashed by means of a valve provided for the purpose. Heat was supplied in exactly the right amount to replace the heat lost in flashing the ethyl chloride; excess heat causes that portion of the polymer only partially solvated to deposit on the walls. The jacket temperature was maintained at about 85° F. except at such times as excessive foaming made it necessary to stop flashing solvent. The pressure during this operation was between 15 and 20 p. s. i.

When the last traces of solvent had been removed, approximately 0.2% potassium oleate based on the solids content was added as a stabilizer to avoid over-rich creaming or crusting of the dispersion.

The dispersion was drawn off by means of the valve provided, and allowed to cream. About five hours were required for the dispersion to cream to 50% solids. 2% solids remained in the serum.

*Example 3*

A copolymer of 97.5% isobutylene and 2.5% isoprene was first dissolved in ethyl chloride.

To the solution (20% rubber by weight) an equal volume of a 2% water solution of dioctyl ester of sodium sulfo-succinic acid dispersing agent was added under pressure.

The bottle was placed on a shaker and the contents allowed to emulsify for one hour at a temperature of 75° F.

The solvent was then flashed and the dispersed rubber dumped from the bottle and allowed to cream.

A portion of the solution does not emulsify but floats on the surface. This is evidently only partially solvated rubber. When analyzed, it proved to be high in gel content and low in unsaturation indicating cross-linkage. In its swollen state it is so voluminous that it appears to be a major portion of the rubber present, but when desolvated represented less than 8% of the rubber being dispersed.

*Example 4*

A solution of a drying oil (prepared by the copolymerization of butadiene and styrene) was prepared by mixing 125 gms. of the oil and 125 gms. of ethyl chloride in a pressure bottle. The bottle was placed on a shaker and, after 15 minutes shaking, was removed and placed in an ice bath. When chilled an equal volume of prechilled 2% dioctyl ester of sodium sulfo-succinic acid solution was added to the contents of the bottle. The bottle was warmed to room temperature and placed on a shaker for one hour during which time emulsification took place. The contents of the bottle was then slowly transferred into an open vessel and the ethyl chloride gas allowed to flash off. Gentle heat (warm water 85° F. applied to the exterior of vessel) and mild agitation were employed during this flashing operation. A stream of nitrogen was also played on the surface. The resulting dispersion was finally placed in a separatory funnel and it creamed to about 55% solids overnight. The dispersion was quite stable after standing several months.

*Example 5*

A purified petroleum sulfonate was added to a 150 gm. batch of the drying oil of Example 4 to the extent of 2 weight percent. It was necessary to heat the batch to 200° F. in order to prepare this solution. The batch was then cooled and dissolved in an equal weight of ethyl chloride by shaking for 15 minutes in a pressure bottle. The bottle and contents were then chilled to 35° F. and an equal volume of prechilled distilled water added. The bottle and its contents were permitted to warm to room temperature and then placed on a shaker for two hours to obtain emulsification. The ethyl chloride gas was then removed as described in Example 4 and the dispersion placed in a separatory funnel where it creamed to approximately 60% solids overnight. After one month standing it had creamed to about 85% solids but it could easily be dispersed with gentle shaking.

The process of the present invention may be used as a step in the manufacture of various polymers so as to prepare them in a readily marketable form. Such a recovery system would only require a water wash for the removal of excess polymerization catalyst and some means of evaporating the solvent used in the polymerization to the proper concentration for emulsification. From then on the process would be as described above.

Polymer in a powdered form, ideal for flame spraying and injection molding can be prepared by the following method:

(1) The water dispersion is first partially coagulated, then filtered to remove the bulk of the water.

(2) The remaining water is stripped from the mass by the passage of dry air through a vertical cylinder containing the easily broken filter cake from the filtering operation.

(3) The air passes out of the cylinder at the top and through a cyclone separator where the dried powder is collected.

A powder might be prepared of almost any dispersion by this method providing the particles did not become tacky on the removal of water.

The nature of the present invention having thus been set forth and specific examples of the same given, what is claimed as new and useful and desired to be secured by Letters Patent is:

1. A process of producing aqueous dispersion of highly polymerized organic substances which comprises dispersing in water under greater than atmospheric pressure at a temperature between 70° and 100° F. a solution of the polymer in a water insoluble, volatile, organic solvent, boiling below 100° F. in the presence of 2%–6% of a surface-active agent and releasing the pressure to vaporize organic solvent while maintaining the temperature between 70° and 100° F.

2. Process according to claim 1 in which the highly polymerized organic substance is a polymer of isobutylene.

3. A process of producing aqueous dispersions of a copolymer of isobutylene and styrene which comprises dispersing in water under greater than atmospheric pressure at a temperature of 75° F., a solution of the polymer in methyl chloride in the presence of 2%–6% of a surface-active agent and flashing off the methyl chloride while maintaining the the temperature at 75° F.

4. A process of producing aqueous dispersions of a copolymer of isobutylene and isoprene which comprises dispersing in water under greater than atmospheric pressure at a temperature of 75° F. a solution of the polymer in ethyl chloride in the presence of 2%–6% of a surface-active agent and flashing off the ethyl chloride while maintaining the temperature at 75° F.

5. Process according to claim 4, using a copolymer of 97.5% isobutylene and 2.5% isoprene.

GEORGE F. LEYONMARK.
ERVING ARUNDALE.

REFERENCES CITED

The following references are of record in the file of this patent:

UNITED STATES PATENTS

| Number | Name | Date |
| --- | --- | --- |
| 2,094,408 | Orthner et al. | Sept. 28, 1937 |
| 2,296,427 | Daniel et al. | Sept. 22, 1942 |
| 2,313,144 | Gomm | Mar. 9, 1943 |
| 2,339,184 | Neher et al. | Jan. 11, 1944 |

FOREIGN PATENTS

| Number | Country | Date |
| --- | --- | --- |
| 574,031 | Great Britain | Dec. 18, 1945 |